Oct. 1, 1935.   A. H. C. TREPTE ET AL   2,015,976
TABLE
Filed June 5, 1934
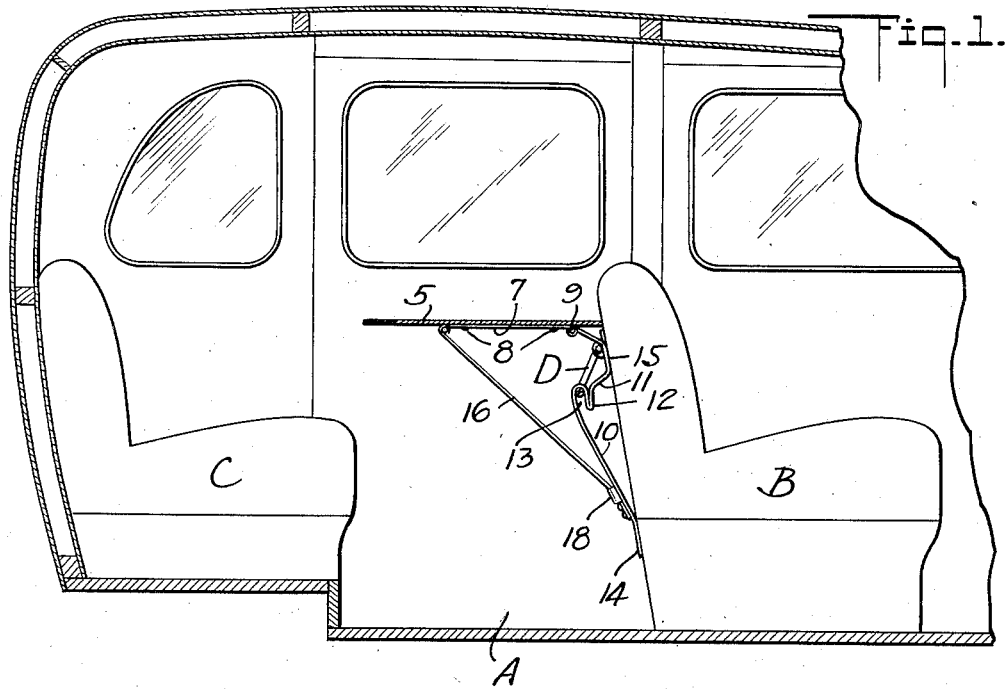
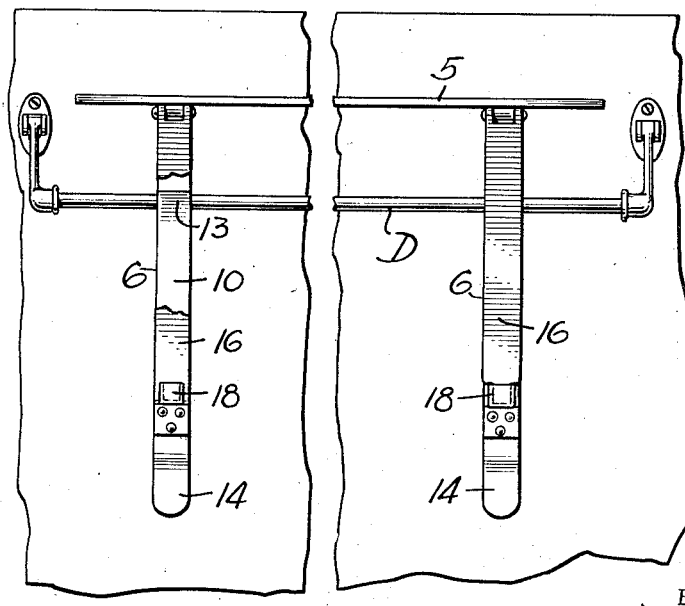
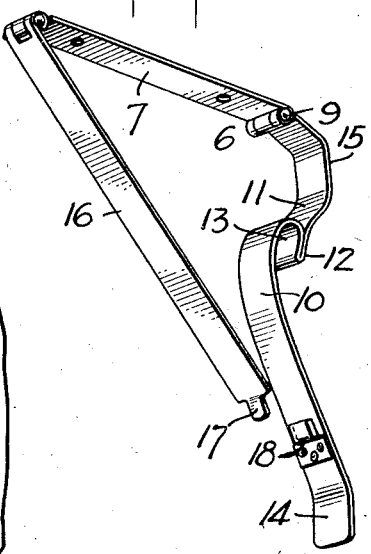
INVENTORS
ALFRED H.C. TREPTE
BY  PINCUS SHALITA
ATTORNEYS.

Patented Oct. 1, 1935

2,015,976

UNITED STATES PATENT OFFICE 2,015,976

TABLE

Alfred H. C. Trepte and Pincus Shalita,
Los Angeles, Calif.

Application June 5, 1934, Serial No. 729,122

2 Claims. (Cl. 311—21)

This invention relates generally to the class of furniture, and same is more particularly directed to tables of a novel type which can be readily connected with the robe rail of an automobile, in a manner to co-act therewith and with the back of the front seat so that the top of the table can be firmly supported in a horizontal position in front of the rear seat of the automobile.

The essential feature of novelty lies in the form and construction of the table which will enable the top thereof to be positioned as aforestated and which will afford ample leg room between the front edge of the rear seat and the adjacent edge of the table and between the floor and the under side of the table top.

A further object is to provide a table of the class described wherein the co-operable parts employed will enable the table to be tilted to assume a vertical position for quick and convenient edgewise insertion of the top through the rear door opening in the body of the automobile and then adjusted to assume the aforestated horizontal position and then finally connected with the robe rail so as to be firmly maintained in said last named position.

We shall describe one form of table embodying our invention and its association with a conventional robe rail of an automobile, and shall then point out the several novel features thereof in the hereto appended claims.

In the accompanying drawing,

Figure 1 is a longitudinal vertical section through such portion of the body of an automobile as is deemed necessary to enable one skilled in the arts to understand the structural and functional characterizing features of the table, the top of the table being illustrated in a horizontal position;

Figure 2 is a view in elevation of the back of the front seat of an automobile showing the table in an applied position, with parts broken away for the purpose of clearness;

Figure 3 is a perspective view of one of the supporting brackets.

While we lay considerable stress upon those features of construction that admirably adapt the table to connection to lap rob rails of automobiles, it is to be clearly understood that this shall not be treated as a limitation and that same, while employed in the environment stated, can be otherwise supported upon some suitable object. We are of the opinion, however, that we are the first in the art to design and construct a table so as to enable same to co-act both with a lap robe rail and the back of an automobile seat so as to be wholly supported in an applied position thereby, and we shall, therefore, claim this combination broadly, and in addition thereto such features per se as may be necessary and in keeping with our position in the art.

In the accompanying drawing, A illustrates an automobile body of conventional form, the same employing a front seat B and a rear seat C. On the back of the front seat is mounted a vertically tiltable lap rob rail D which extends longitudinally of the back of the seat near the upper edge thereof. The said lap rob rail is in the form of a smooth straight bar which lies parallel to the said back of the front seat.

The table comprises a flat top 5 and two supporting brackets 6—6, the latter being disposed at a suitable distance apart from each other to give the intended rigidity to the top when the table is adjusted to the full line positions shown in Figures 1 and 2 of the drawing. Each of the brackets includes an attaching member 7 in the form of a flat strip of metal which is secured flatwise against the under side of the top 5. This can be nicely accomplished merely by driving screws or other suitable fastening devices 8 through the members and into the top, as will be appreciated upon reference to Figure 1.

Hinged at 9 to the rear end of each member 7 is a brace 10, the same being offset laterally at 11, to firmly rest against the back of the front seat B. The brace continues vertically downward from the offset portion aforementioned and same is upset upon itself at 12, then formed into a downwardly opening loop 13. From the loop, the brace extends downwardly and forwardly at a suitable angle and same terminates in a foot piece 14 which is alined with the flat face 15 of the lateral offset portion 11 so as to conform to the angle of the back of the front seat and thus co-act with the face 15 to afford a high measure of rigity for the top 5.

At the front end of each member 7 and hingedly connected thereto is a brace member 16, the lower end of which is formed to provide a reduced tongue 17 which is releasably engaged in the upwardly facing socket 18 on the brace 10.

By combining the structural elements as herein described, a flexible or more or less collapsible structure is produced, whereby when the props 16 are disengaged from the sockets 18 the top of the table can be folded to assume a vertical position. This enables the device to be easily passed edgewise through the door opening in the automobile body and the loops 13 passed over the straight horizontal bar of the aforementioned lap robe rail D. When this is accomplished, the top of the table can be quickly swung downwardly to a horizontal position and the prop then engaged with the sockets 18, at which time the entire device will be mounted in a position where it can be used by persons occupying the rear seat, or even by those occupying the front seat, although not quite as conveniently.

Although we have herein shown and described only one form of table embodying the invention, it is to be understood that various changes and modifications may be made therein without departing from the spirit of the invention and the spirit and scope of the appended claims.

What we claim as our invention is:

1. A table structure for automobile seats having a lap robe rail at the back thereof comprising a top having a bracket provided at one end with a brace formed with a loop to hingedly receive the robe rail to enable the top to be folded from a vertical position in back of the seat to a horizontal position, and said brace having portions disposed respectively above and below the loop and adapted to firmly engage against the back of the seat when the top is in a horizontal position, and a prop hinged to the top and provided with a free extremity engageable with the brace to hold the top against downward tilting movement when in said horizontal position.

2. A device of the class described comprising an attaching member adapted to be secured to a table top, a vertically disposed brace hinged at its upper end to one end of said member and formed with a loop adapted to receive a supporting device and said brace having a socket disposed below the loop, and a hinged prop at the front of the member and provided with means for removable reception in said socket.

ALFRED H. C. TREPTE.
PINCUS SHALITA.